(12) United States Patent
Okazaki et al.

(10) Patent No.: US 11,786,931 B2
(45) Date of Patent: Oct. 17, 2023

(54) METHOD FOR PRODUCING COATED MATERIAL BY USING ELECTRON BEAM-CURABLE COMPOSITION

(71) Applicants: TOAGOSEI CO., LTD., Tokyo (JP); TOYOTA JIDOSHA KABUSHIKI KAISHA, Toyota (JP)

(72) Inventors: Eiichi Okazaki, Nagoya (JP); Kazuki Ofusa, Nagoya (JP); Katsunobu Mochizuki, Nagoya (JP); Shinya Kanbe, Nagoya (JP); Nobuaki Koike, Nagoya (JP); Keiji Ambo, Toyota (JP); Atsuo Nabeshima, Toyota (JP); Mamoru Kouzaki, Toyota (JP); Shuji Yomo, Nagakute (JP); Kanji Mori, Nagakute (JP)

(73) Assignees: TOAGOSEI CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 17/129,099

(22) Filed: Dec. 21, 2020

(65) Prior Publication Data
US 2021/0268541 A1 Sep. 2, 2021

(30) Foreign Application Priority Data
Dec. 24, 2019 (JP) .................. 2019-232926

(51) Int. Cl.
*B05D 3/06* (2006.01)
*B05D 7/00* (2006.01)
(Continued)

(52) U.S. Cl.
CPC ............. *B05D 3/068* (2013.01); *B05D 7/576* (2013.01); *C09D 133/08* (2013.01); *C08K 3/04* (2013.01);
(Continued)

(58) Field of Classification Search
None
See application file for complete search history.

(56) References Cited

U.S. PATENT DOCUMENTS

| | | | |
|---|---|---|---|
| 5,077,347 A | | 12/1991 | Yabuta et al. |
| 5,093,223 A | * | 3/1992 | Iwasawa ................. G03F 7/038 |
| | | | 522/90 |
| 6,242,101 B1 | * | 6/2001 | Schwalm ................. C09D 4/00 |
| | | | 522/174 |

FOREIGN PATENT DOCUMENTS

| | | |
|---|---|---|
| EP | 0 411 630 A2 | 2/1991 |
| JP | 3-66770 A | 3/1991 |

(Continued)

OTHER PUBLICATIONS

Office Action dated Apr. 19, 2022, issued in counterpart CN application No. 202011549617.0, with English translation (16 pages).
(Continued)

*Primary Examiner* — Jeffrey D Washville
(74) *Attorney, Agent, or Firm* — WHDA, LLP

(57) ABSTRACT

An object of the present invention is to provide a method for producing a coated material by using a composition that can be spray-coated, and that does not run downward after coating (i.e., rheology controllable). The method for producing a coated material includes step (1) of applying an electron beam-curable composition containing an ethylenically unsaturated group-containing compound to a substrate to form a coating film that has a surface viscosity of 1 Pa·s to 300 Pa·s as measured based on an electric-field pickup method, step (2) of drying the coating film obtained in step (1) to form a dry coating film when the electron beam-curable composition contains a volatile component, and step (3) of irradiating the substrate that has the coating film (Continued)

obtained in step (1) or the dry coating film obtained in step (2) with electron beams in an inert gas atmosphere to form a cured coating film.

14 Claims, 1 Drawing Sheet

(51) Int. Cl.
*C09D 133/08* (2006.01)
*C08K 3/04* (2006.01)
*C08K 3/08* (2006.01)
*C08K 3/22* (2006.01)

(52) U.S. Cl.
CPC ............... *C08K 3/08* (2013.01); *C08K 3/22* (2013.01); *C08K 2003/0812* (2013.01); *C08K 2003/2237* (2013.01)

(56) References Cited

FOREIGN PATENT DOCUMENTS

| | | |
|---|---|---|
| JP | 6-70110 B2 | 9/1994 |
| JP | 4325958 B2 * | 9/2009 |
| JP | 2011-084699 A | 4/2011 |

OTHER PUBLICATIONS

Qingzhang Li, "Surface Decoration of Artificial Boards", Northeast Forestry University Press, Edition 1, 1st Print Dec. 1989, pp. 312-313, with partial translation, cited in CN Office Action dated Mar. 17, 2023. (6 pages).

Office Action dated Mar. 17, 2023, issued in counterpart CN application No. 202011549617.0, with English translation. (12 pages).

* cited by examiner

METHOD FOR PRODUCING COATED MATERIAL BY USING ELECTRON BEAM-CURABLE COMPOSITION

TECHNICAL FIELD

The present invention relates to a method for producing a coated material by using an electron beam-curable composition.

BACKGROUND ART

Currently, intermediate paint, base paint, and clear paint are used for automotive paint; and a baking step for a paint is indispensable in each process. However, $CO_2$ generated in the baking step and energy cost due to heating have been problems. Because the components of automobiles are intricately shaped, spray-coating is preferable for coating the components with paint.

For example, a paint having a specific viscosity usable in spray-coating is known (PTL 1). This paint, however, requires a baking step; and thus requires a significant process improvement to reduce $CO_2$ generated in the baking step and energy cost.

Studies have been conducted on active energy ray-curable coating composition as paint for automobiles that can solve the above-stated problems; that does not require the baking step, or decreases the baking temperature; and that can even be cured in a short period of time.

However, conventional active energy ray-curable paint is difficult to cure in the intricate shape of automobiles, and has not been fully put into practice. Additionally, active energy ray-curable paint must have a low viscosity in performing spray-coating. Thus, sagging occurs with such paint after spray-coating.

CITATION LIST

Patent Literature

PTL 1: JP2011-84699A

SUMMARY OF INVENTION

Technical Problem

An object of the present invention is to provide a method for producing a coated material by using a composition that can be spray-coated, and that does not run downward after coating (i.e., rheology controllable).

Another object of the present invention is to provide a method for producing a coated material by using a composition that can be cured by an electron beam in a short period of time.

Another object of the present invention is to provide a method for producing a coated material by using a composition that can be suitably cured along the intricate shape of an irradiated substrate (e.g., the body of an automobile).

Another object of the present invention is to provide a method for producing a coated material by using a composition that can be cured simultaneously when two or more coating films are formed.

Solution to Problem

The present inventors found that a method for producing a coated material that includes specific production steps can achieve the objects.

Specifically, the present invention includes the following methods for producing a coated material.

Item 1.

A method for producing a coated material, the method comprising the following steps (1) and (3), or the following steps (1) to (3):

step (1) of applying an electron beam-curable composition containing an ethylenically unsaturated group-containing compound to a substrate to form a coating film that has a surface viscosity of 1 Pa·s to 300 Pa·s as measured based on an electric-field pickup method, step (2) of drying the coating film obtained in step (1) to form a dry coating film when the electron beam-curable composition contains a volatile component, and step (3) of irradiating the substrate that has the coating film obtained in step (1) or the dry coating film obtained in step (2) with an electron beam in an inert gas atmosphere to form a cured coating film.

Item 2.

The method for producing a coated material according to Item 1, wherein the cured coating film obtained after step (3) has an elongation at break of 5% or more.

Item 3.

The method for producing a coated material according to Item 1 or 2, wherein the electron beam-curable composition in step (1) has a viscosity of 1 Pa·s to 300 Pa·s as measured at a shear rate of 0.1/s.

Item 4.

The method for producing a coated material according to any one of Items 1 to 3, wherein the electron beam-curable composition in step (1) has a viscosity of 1 Pa·s to 300 Pa·s as measured at a shear rate of 0.1/s, and has a viscosity of 0.01 Pa·s to 0.3 Pa·s as measured at a shear rate of 1,000/s.

Item 5.

The method for producing a coated material according to any one of Items 1 to 3, wherein in step (1), the electron beam-curable composition for use is in the form of an aqueous dispersion, and the electron beam-curable composition is applied to the substrate by spraying to form a coating film; and in step (2), the volatile component contained in the electron beam-curable composition in the coating film is evaporated to form a dry coating film.

Item 6.

The method for producing a coated material according to any one of Items 1 to 5, wherein the method uses two or more electron beam-curable compositions each containing an ethylenically unsaturated group-containing compound for forming a cured coating film, in order to form two or more cured coating films, and the method comprises performing a series of steps (1) and (2) at least two times and then performing step (3).

Item 7.

The method for producing a coated material according to Item 6, wherein the method uses two or more electron beam-curable compositions each containing an ethylenically unsaturated group-containing compound for forming a cured coating film, in order to form two or more cured coating films, and the method comprises the step of applying an electron beam-curable composition for forming a first cured coating film to the substrate to form a coating film, this step corresponding to step (1), the step of drying the coating film to form a dry coating film when the electron beam-curable composition for forming the first cured coating film contains a volatile component, this step corresponding to step (2), the step of applying an electron beam-curable composition for forming a second cured coating film to the coating film obtained in step (1) above or the dry coating film obtained in step (2) above to form a coating film that has a surface viscosity of 1 Pa·s to 300 Pa·s as measured based on the electric-field pickup method, this step corresponding to step (1), the step of drying the coating film to form a dry coating film when the electron beam-curable composition for forming the second cured coating film contains a volatile component, this step corresponding to step (2), the step of optionally further performing a series of steps (1) and (2) to form coating films or dry coating films of the two or more electron beam-curable compositions on the substrate, and the step of irradiating the substrate that has two or more coating films or dry coating films obtained above with the electron beam to form cured coating films, this step corresponding to step (3).

Item 8.

The method for producing a coated material according to any one of Items 1 to 7, wherein the inert gas in step (3) contains nitrogen gas as a main component and has an oxygen concentration of 0.1% by volume or less.

Item 9.

The method for producing a coated material according to any one of Items 1 to 8, wherein the electron beam in step (3) has an accelerating voltage of 80 kV to 300 kV and has an absorbed dose of 10 kGy to 1,000 kGy.

Item 10.

The method for producing a coated material according to any one of Items 1 to 9, wherein the substrate in step (1) is made of metal or plastic.

Item 11.

The method for producing a coated material according to any one of Items 1 to 10, wherein the substrate in step (1) is made of plastic and has a surface free energy of 38 dyn/cm or more.

Item 12.

The method for producing a coated material according to Item 11, wherein the substrate in step (1) is made of plastic and is surface-treated.

Item 13.

The method for producing a coated material according to any one of Items 1 to 12, wherein the substrate in step (1) has an uneven portion, a curved portion, and/or a bent portion.

Item 14.

The method for producing a coated material according to any one of Items 1 to 13, wherein the one or more electron beam-curable compositions in step (1) contain, as the ethylenically unsaturated group-containing compound, (i) a compound having an aromatic ring and one (meth)acryloyl group and (ii) an oligomer or polymer having a (meth)acryloyl group.

Item 15.

A coated material obtained by the method for producing a coated material according to any one of Items 1 to 14, the coated material comprising one or more cured coating films that have a film thickness of 5 μm to 500 μm, the coated material being a coated substrate for automobiles.

Advantageous Effects of Invention

The present invention can produce a coated material by using a composition that can be spray-coated, and that does not run downward after coating (i.e., rheology controllable).

The present invention can produce a coated material preferably by using a composition that can be cured by electron beams in a short period of time.

The present invention can produce a coated material preferably by using a composition that can be suitably cured along the intricate shape of an irradiated substrate (e.g., the body of an automobile).

The present invention can produce a coated material preferably by using compositions that can be cured simultaneously when two or more coating films are formed.

The present invention can produce a coated material preferably by using a composition that can be cured well when the electron beam-curable composition for use contains a volatile component (e.g., an aqueous dispersion composition).

BRIEF DESCRIPTION OF DRAWINGS

FIG. 2 illustrates an example of the substrate having a dry coating film thereon arranged at an angle of 0° (1), 45° (2), and 75° (3) with respect to the plane of the window for electron beam irradiation.

DESCRIPTION OF EMBODIMENTS

Figure 1:
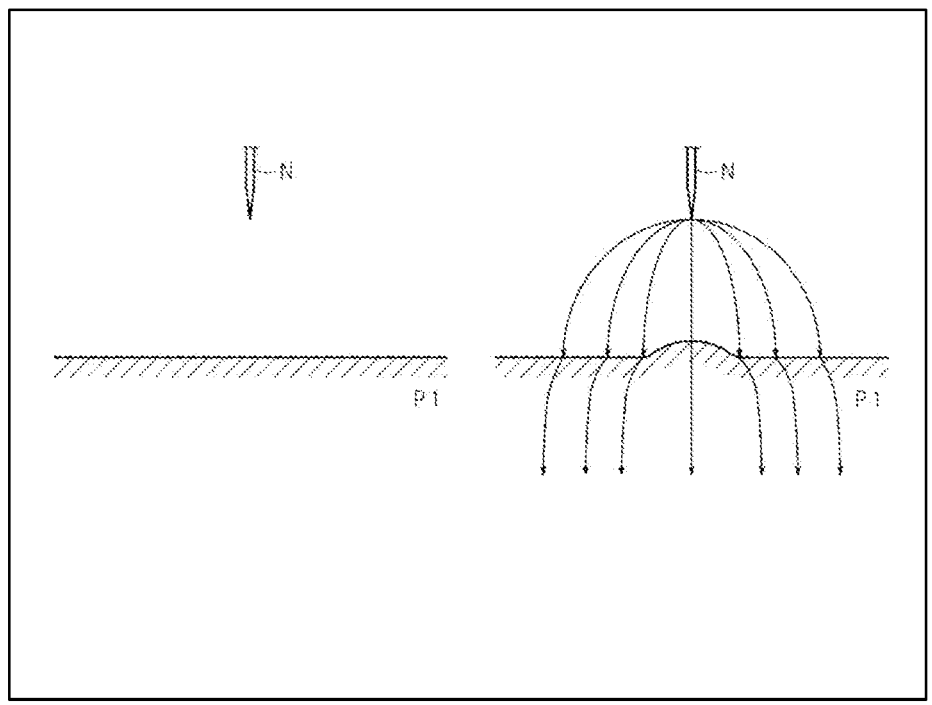
FIG. 1 is a conceptual diagram that conceptually illustrates the principle of an electric-field pickup method.

The following describes in detail the method for producing a coated material and the coated material that is a substrate for automobiles according to the present invention.

In the present specification, the phrase "coating film" refers to a coating film formed by applying an electron beam-curable composition to a substrate when the electron beam-curable composition is free of a volatile component.

In the present specification, the phrase "dry coating film" refers to a coating film formed by applying an electron beam-curable composition to a substrate, and further drying the coating film to evaporate a volatile component when the electron beam-curable composition contains the volatile component.

In the present specification, the phrase "cured coating film" refers to a coating film formed by irradiating the coating film or dry coating film with electron beams to cure the ethylenically unsaturated group-containing compound in the composition.

In the present specification, "(meth)acryloyl group" refers to "acryloyl group and/or methacryloyl group," "(meth)acrylate" refers to "acrylate and/or methacrylate," and "(meth)acrylic acid" refers to "acrylic acid and/or methacrylic acid."

In the present specification, the electron beam-curable composition may be simply referred to as "composition."

[1] Method for Producing Coated Material

The method for producing a coated material according to the present invention relates to a method for producing a coated material including the following steps (1) and (3), or the following steps (1) to (3):

step (1) of applying an electron beam-curable composition containing an ethylenically unsaturated group-containing compound to a substrate to form a coating film that has a surface viscosity of 1 Pa·s to 300 Pa·s as measured based on an electric-field pickup method, step (2) of drying the coating film obtained in step (1) to form a dry coating film when the electron beam-curable composition contains a volatile component, and step (3) of irradiating the substrate that has the coating film obtained in step (1) or the dry coating film obtained in step (2) with an electron beam in an inert gas atmosphere to form a cured coating film.

The following describes steps (1) to (3).

(1) Step (1)

In step (1) of the method for producing a coated material according to the present invention, an electron beam-curable composition containing an ethylenically unsaturated group-containing compound is applied to a substrate to form a coating film that has a surface viscosity of 1 Pa·s to 300 Pa·s as measured based on an electric-field pickup method.

The "ethylenically unsaturated group-containing compound" may also be referred to as "unsaturated compound" below.

(1-1) Substrate

The substrate coated with an electron beam-curable composition in step (1) is preferably made of metal or plastic.

The substrate for use is preferably made of metal.

The metal includes metals, such as steel plate, aluminum, and chromium; and metal oxides, such as zinc oxide (ZnO) and indium tin oxide (ITO).

A preferable metallic substrate for use is, for example, a surface-treated metal, such as metal subjected to rust-proof treatment; and a metal whose surface is coated with paint. The metallic substrate for use is preferably a surface-treated metal, such as metal subjected to rust-proof treatment, with the surface further coated with an electrodeposition paint.

Plastic is preferably used in the substrate.

Specific examples of plastic include polyolefins, such as polyethylene and polypropylene; cellulose acetate resins, such as ABS resin, polyvinyl alcohol, triacetyl cellulose, and diacetyl cellulose; cyclic polyolefin resins containing a cyclic olefin as a monomer, such as acrylic resin, polyethylene terephthalate, polycarbonate, polyarylate, polyethersulfone, and norbornene; polyvinyl chloride; epoxy resins; and polyurethane resins.

The substrate for use in the present invention is preferably made of plastic, and preferably has a surface free energy of 38 dyn/cm or more.

The substrate is preferably made of plastic and surface-treated from the standpoint of improving its adhesion with a cured coating film. The surface treatment applied to the substrate is preferably a physical treatment.

Examples of surface treatments applied to a plastic substrate include roughening treatment using sandblasting, plasma treatment, corona treatment, flame treatment, and primer treatment. A plastic substrate is preferably subjected to flame treatment, plasma treatment, or the like.

Roughening the surface of a plastic substrate brings about an anchoring effect due to the resin of the plastic substrate, thereby increasing the adhesion between sheets.

Corona treatment (corona discharge treatment) ionizes air by a high-frequency wave generated from a corona processor to generate charged particles; these particles collide with the surface of an object to be treated and oxidize the surface, thereby modifying the surface. Corona treatment can be performed, for example, by corona discharge irradiation under normal pressure in an air or oxygen atmosphere. Performing corona treatment on the surface of a plastic substrate forms functional groups, such as carbonyl, hydroxyl, peroxide, aldehyde, ether, or carboxylic acid. These functional groups can increase the adhesion strength between plastic substrates.

Plasma discharge treatment activates the surface by bringing the plasma generated, for example, under atmospheric pressure into contact with the surface of the object to be treated. Examples of the gas for generating plasma include noble gases such as helium and argon, nitrogen gas, and air. Methods for performing plasma discharge treatment under atmospheric pressure includes a method of applying a high voltage with a high frequency across parallel-plate electrodes at least one of which is coated with a dielectric to generate plasma, and holding or moving an object to be treated in the plasma; and a method of arranging a pair of electrodes at least one of which is coated with a dielectric such that the electrodes face to each other to form a discharge space, applying a high voltage with a high frequency to pump a plasma gas, ejecting the generated plasma out of the discharge space, and bringing the plasma into contact with an object to be treated. Performing plasma treatment on the surface of a plastic substrate by using a known gas, such as argon, helium, nitrogen, or oxygen, can modify the surface. This can form functional groups, such as amino, carboxyl, hydroxyl, and aldehyde, on the surface of the plastic substrate. This can increase the surface energy of the plastic substrate and increase the wettability on an adhesive, thereby improving adhesiveness.

Flame treatment can be performed, for example, by treating with an oxidizing flame, such as utility gas or propane gas (temperature: 1,000 to 2,700° C.); after a few seconds of exposure to the flame, the surface is oxidized, and polar groups can be introduced. Performing flame treatment on the surface of a plastic substrate can form functional groups, such as hydroxyl, carbonyl, carboxyl, and amide, on the surface of the plastic substrate in a short period of time. This can increase the surface energy of the plastic substrate and increase the wettability on an adhesive, thereby improving adhesiveness.

Performing primer treatment on the surface of a plastic substrate can improve adhesiveness with, for example, an adhesive, due to polyfunctional reactive groups present in the active species of the primer remaining on the surface of the plastic substrate.

The substrate for use may be those with a variety of shapes.

The substrate is preferably not only a substrate with a flat surface, but also a substrate with an uneven portion, a curved portion, and/or a bent portion. The substrate with an uneven portion, a curved portion, and/or a bent portion for use is preferably those whose curved portion or bent portion is inclined by 45° or more with respect to the plane of the window for electron beam irradiation.

(1-2) Electron Beam-Curable Composition

The electron beam-curable composition applied to a substrate in step (1) contains an unsaturated compound (an ethylenically unsaturated group-containing compound).

The following describes the unsaturated compound.

(1-2-1) Unsaturated Compound

The unsaturated compound has an ethylenically unsaturated group in its molecule.

Ethylenically unsaturated groups present in the unsaturated compound include a (meth)acryloyl group, a vinyl group, and a vinyl ether group.

Specifically, compounds having a (meth)acryloyl group include (meth)acrylate and (meth)acrylamide.

Specifically, compounds having a vinyl group include aromatic vinyl compounds, such as styrene and vinyl toluene, vinyl acetate, N-vinylpyrrolidone, N-vinylformamide, and N-vinylcaprolactam.

The ethylenically unsaturated group is preferably a (meth)acryloyl group; specifically, (meth)acrylate. The following describes (meth)acrylate.

(Meth)acrylate (Meth)acrylates include a compound having a single (meth)acryloyl group per molecule ("monofunctional (meth)acrylate" below), and a compound having two or more (meth)acryloyl groups per molecule ("polyfunctional (meth)acrylate" below).

Examples of monofunctional (meth)acrylates include alkyl (meth)acrylates, such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, neopentyl (meth)acrylate, hexyl (meth)acrylate, 2-ethylhexyl (meth)acrylate, isooctyl (meth)acrylate, nonyl (meth)acrylate, isononyl (meth)acrylate, lauryl (meth)acrylate, tridecyl (meth)acrylate, and stearyl (meth)acrylate;

alicyclic (meth)acrylates, such as cyclohexyl (meth)acrylate, tricyclodecane (meth)acrylate, dicyclopentenyl (meth)acrylate, dicyclopentanyl (meth)acrylate, dicyclopentenyl oxyethyl (meth)acrylate, dicyclopentanyl oxyethyl (meth)acrylate, tricyclodecanyl (meth)acrylate, isobornyl (meth)acrylate, and adamantyl (meth)acrylate;

hydroxy-containing (meth)acrylates, such as 2-hydroxyethyl (meth)acrylate, 2-hydroxypropyl (meth)acrylate, 4-hydroxybutyl (meth)acrylate, and adducts of ε-caprolactone to 2-hydroxyethyl (meth)acrylate;

alkoxy alkyl (meth)acrylates, such as 2-methoxyethyl (meth)acrylate, methoxy triethylene glycol (meth)acrylate, 2-ethylhexyl carbitol (meth)acrylate, and ethoxyethoxyethyl (meth)acrylate;

heteroatom-containing (meth)acrylates, such as dimethylaminoethyl (meth)acrylate and trifluoroethyl (meth)acrylate;

aromatic (meth)acrylates, such as phenoxyethyl (meth)acrylate, o-phenylphenoxyethyl (meth)acrylate, p-cumylphenoxyethyl (meth)acrylate, nonylphenoxyethyl (meth)acrylate, benzyl (meth)acrylate, alkylene oxide-modified phenol derivative (meth)acrylates, and 2-hydroxy-3-phenoxypropyl (meth)acrylate;

tetrahydrofurfuryl (meth)acrylate;

maleimide (meth)acrylates, such as N-(meth)acryloyloxyethyl tetrahydrophthalimide and N-(meth)acryloyloxyethyl hexahydrophthalimide;

glycidyl (meth)acrylate, polycaprolactone-modified (meth)acrylic acid, and polycaprolactone-modified 2-hydroxyethyl (meth)acrylate;

alkoxy silyl group-containing (meth)acrylates, such as 3-trimethoxy silylpropyl (meth)acrylate, 3-triethoxy silylpropyl (meth)acrylate, 3-triisopropoxy silylpropyl (meth)acrylate, 3-methyl dimethoxy silyl propyl (meth)acrylate, 3-methyldiethoxy silylpropyl (meth)acrylate, 3-methyldiisopropoxy silylpropyl (meth)acrylate, 3-dimethylmethoxy silylpropyl (meth)acrylate, 3-dimethylethoxy silylpropyl (meth)acrylate, 3-dimethylisopropoxy silylpropyl (meth)acrylate, and 8-trimethoxy silyloctyl (meth)acrylate; and oxazolidinone ethyl (meth)acrylate.

Examples of polyfunctional (meth)acrylates include, but are not limited to, polyolpoly(meth)acrylates, such as 1,4-butanediol di(meth)acrylate, neopentylglycol di(meth)acrylate, 1,6-hexanediol di(meth)acrylate, 1,9-nonanediol di(meth)acrylate, tricyclodecane dimethanol di(meth)acrylate, neopentylglycol di(meth)acrylate hydroxypivalate, 3-methyl-1,5-pentanediol di(meth)acrylate, 2-butyl-2-ethyl-1,3-nonanediol diacrylate, 2-methyl-1,8-octanediol di(meth)acrylate, 2-hydroxy-1,3-di(meth)acryloyloxypropane, 2-hydroxy-3-(meth)acryloyloxypropyl (meth)acrylate, glycerol di(meth)acrylate, trimethylol propane tri(meth)acrylate, pentaerythritol tri(meth)acrylate, pentaerythritol tetra(meth)acrylate, dipentaerythritol penta(meth)acrylate, dipentaerythritol hexa(meth)acrylate, and ditrimethylol propane tetra(meth)acrylate;

poly(meth)acrylates in which alkylene oxide (e.g., ethylene oxide and propylene oxide) is added to the starting material alcohols of the poly(meth)acrylates described above;

poly(meth)acrylates in which the starting material alcohols of the poly(meth)acrylates described above are modified with caprolactone; and alkylene oxide-modified isocyanuric acid poly(meth)acrylates, such as ethylene oxide-modified isocyanuric acid di(meth)acrylate and ethylene oxide-modified isocyanuric acid tri(meth)acrylate.

The polyfunctional (meth)acrylate for use may be an oligomer or polymer.

Specific examples of oligomers include urethane (meth)acrylate, polyester (meth)acrylate, and epoxy (meth)acrylate.

The oligomer or polymer is preferably a compound having a molecular weight of 500 to 50,000. The phrase "molecular weight" refers to an absolute molecular weight that can be measured by mass spectrometry, and the molecular weight of a polymer refers to a weight average molecular weight ("Mw" below). "Mw" refers to polystyrene equivalent Mw measured by gel permeation chromatography (GPC).

Urethane (Meth)acrylate

Urethane (meth)acrylates refer to compounds having a urethane bond, and two or more (meth)acryloyl groups.

Examples of urethane (meth)acrylates include reaction products of an polyol, an organic polyisocyanate, and a hydroxy-containing (meth)acrylate, and reaction products of an organic polyisocyanate and a hydroxy-containing (meth)acrylate (urethane adducts).

The polyol for use as a starting material of urethane (meth)acrylate is preferably a diol; a low-molecular weight diol, a diol with a polyester skeleton, a diol with a polyether skeleton, and a diol with a polycarbonate skeleton are preferably used.

Low-molecular-weight diols include ethylene glycol, propylene glycol, cyclohexane dimethanol, neopentylglycol, 3-methyl-1,5-pentanediol, and 1,6-hexanediol.

Diols with a polyester skeleton include esterified products of a diol component such as the low-molecular weight diols described above or polycaprolactone diols and an acid component, such as dicarboxylic acid or dicarboxylic anhydride.

Dicarboxylic acid or dicarboxylic anhydride includes adipic acid, succinic acid, phthalic acid, tetrahydrophthalic acid, hexahydrophthalic acid, terephthalic acid, and anhydrides thereof.

Diols with a polyether skeleton include polyethylene glycol, polypropylene glycol, and polytetramethylene glycol.

Diols with a polycarbonate skeleton include reaction products of at least one diol selected from the group consisting of the low-molecular-weight diols described above and bisphenols (e.g., bisphenol A) with dialkyl ester carbonate such as ethylene carbonate and dibutyl ester carbonate.

Organic polyisocyanates include alicyclic group-free aliphatic polyisocyanates (aliphatic polyisocyanates), alicyclic group-containing aliphatic polyisocyanates (alicyclic polyisocyanates), heterocyclic ring-containing polyisocyanates, and aromatic polyisocyanates.

Aliphatic polyisocyanates include hexamethylene diisocyanate, tetramethylene diisocyanate, trimethyl hexamethylene diisocyanate, and lysine diisocyanate.

Alicyclic polyisocyanates include hydrogenated tolylene diisocyanate, hydrogenated 4,4'-diphenyl methane diisocyanate, hydrogenated xylene diisocyanate, 4,4'-dicyclohexyl methane diisocyanate, and isophorone diisocyanate.

Heterocyclic ring-containing polyisocyanates include hexamethylene diisocyanate trimers and isophorone diisocyanate trimers.

Aromatic diisocyanates include tolylene diisocyanate, 4,4'-diphenyl methane diisocyanate, xylylene diisocyanate, para-phenylene diisocyanate, and 1,5-naphthalene diisocyanate.

The organic polyisocyanate for use in the present invention is preferably an aliphatic polyisocyanate and a heterocyclic ring-containing polyisocyanate due to excellent physical properties of their cured products, and less yellowing.

The hydroxy-containing (meth)acrylate is preferably a hydroxy-containing mono(meth)acrylate. Hydroxy-containing mono(meth)acrylates include hydroxyalkyl (meth)acrylates, such as 2-hydroxyethyl (meth)acrylate, 2-hydroxypropyl (meth)acrylate, hydroxybutyl (meth)acrylate, hydroxypentyl (meth)acrylate, hydroxyhexyl (meth)acrylate, and hydroxyoctyl (meth)acrylate.

Urethane Adduct

An urethane adduct refers to a reaction product of an organic polyisocyanate with a hydroxy-containing (meth)acrylate. The use of an urethane adduct is preferable from the standpoint of increased crosslinking density, increased heat resistance, and increased toughness.

The organic polyisocyanate and hydroxy-containing (meth)acrylate for the urethane adduct include the compounds described above.

The hydroxy-containing (meth)acrylate for use in the urethane adduct can be a compound having hydroxyl and two or more (meth)acryloyl groups ("hydroxy-containing polyfunctional (meth)acrylate" below).

The use of a reaction product of an organic polyisocyanate with a hydroxy-containing polyfunctional (meth)acrylate as a urethane adduct is preferable from the standpoint of increased crosslinking density and excellent heat resistance, abrasion resistance, and scratch resistance.

The hydroxy-containing polyfunctional (meth)acrylate for use can be selected from a variety of compounds. Specific examples include trimethylol propane di(meth)acrylate, pentaerythritol di or tri(meth)acrylate, ditrimethylol propane di or tri(meth)acrylate, and dipentaerythritol di, tri, tetra, or penta(meth)acrylate.

A preferable compound for use as an urethane adduct includes a reaction product of an organic polyisocyanate having three or more isocyanate groups with a hydroxy-containing mono(meth)acrylate.

The hydroxy-containing mono(meth)acrylate for use in the urethane adduct includes the compounds described above.

Polyester (Meth)acrylate

Polyester (meth)acrylate refers to a reaction product of a polyester polyol with (meth)acrylic acid.

The polyester polyol can be obtained by reacting a polyhydric alcohol with a polybasic acid or an anhydride thereof.

Polyhydric alcohols include diols having an alicyclic group, such as the low-molecular-weight diols described above, tricyclodecane dimethylol, and bis(hydroxymethyl) cyclohexane, and trihydric or higher alcohols, such as trimethylol propane and pentaerythritol.

Polybasic acids or anhydrides thereof include the compounds described above.

Epoxy (Meth)acrylate

Epoxy (meth)acrylate refers to a reaction product of an epoxy resin with (meth)acrylic acid.

Specific examples of epoxy (meth)acrylates include (meth)acrylate of bisphenol A-type epoxy resin, (meth)acrylic acid adducts of phenol or cresol novolac-type epoxy resin, (meth)acrylic acid adducts of bisphenol A diglycidyl ether, (meth)acrylic acid adducts of brominated bisphenol A diglycidyl ether, and (meth)acrylic acid adducts of polyether diglycidyl ether.

Polymer Having (Meth)acryloyl Group

Polymers having a (meth)acryloyl group include a variety of polymers having a (meth)acryloyl group in their side chain.

Polymers having a (meth)acryloyl group include a reaction product of a functional group-containing polymer with a (meth)acryloyl group-containing compound having a functional group reactive with the functional group of the functional group-containing polymer ("reactive (meth)acryloyl group-containing compound" below).

Examples of functional groups of the functional group-containing polymer include an epoxy group, an acidic group, a hydroxyl group, and an isocyanate group.

In this case, the functional group-containing polymer is preferably a copolymer of an alkyl (meth)acrylate with a functional group-containing monomer.

Examples of alkyl (meth)acrylates include methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, cyclohexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate.

Examples of functional group-containing monomers include epoxy group-containing monomers, acidic group-containing monomers, hydroxy-containing monomers, and isocyanate group-containing monomers.

Examples of epoxy group-containing monomers include glycidyl (meth)acrylate.

Examples of acidic group-containing monomers include carboxyl group-containing monomers, such as (meth)acrylic acid; sulfonic acid group-containing monomers, such as acrylamide 2-methylpropane sulfonic acid and styrenesulfonic acid; and phosphate group-containing monomers.

Examples of hydroxy-containing monomers include hydroxyalkyl (meth)acrylates, such as hydroxyethyl (meth)acrylate, hydroxyethyl (meth)acrylate, and hydroxybutyl (meth)acrylate.

Examples of isocyanate group-containing monomers include (meth)acryloxy alkyl isocyanates, such as (meth)acryloxy ethyl isocyanate.

The functional group-containing polymer may be such polymers further copolymerized with other monomers in addition to those described above.

Specific examples of such other monomers include cyano group-containing monomers, such as (meth)acrylonitrile; vinyl ester; aromatic vinyl compounds, such as styrene and α-methyl styrene; acid anhydride group-containing monomers; amide group-containing monomers, such as (meth) acrylamide, dimethyl acrylamide, and diethyl (meth)acrylamide; amino group-containing monomers; imide group-containing monomers; (meth)acryloyl morpholine; and vinyl ether.

An epoxy group- or hydroxyl group-containing polymer, which is a functional group-containing polymer, is reacted with (meth)acrylic acid or an acidic group-containing (meth) acrylate, which is a reactive (meth)acryloyl group-containing compound, to produce a (meth)acryloyl group-containing polymer.

An acidic group- or isocyanate group-containing polymer, which is a functional group-containing polymer, is reacted with a hydroxyl group-containing (meth)acrylate, which is a reactive (meth)acryloyl group-containing compound, to produce a (meth)acryloyl group-containing polymer.

These monofunctional or polyfunctional (meth)acrylates may be used singly, or in a combination of two or more.

The electron beam-curable composition preferably contains, as an unsaturated compound, (i) a compound having an aromatic ring and one (meth)acryloyl group ("compound (i)" below); and (ii) an oligomer or polymer having a (meth)acryloyl group ("compound (ii)" below) (in combination).

Examples of compound (i) include the aromatic (meth) acrylates listed as examples of monofunctional (meth)acrylates above.

Examples of compound (ii), which is an oligomer or polymer having a (meth)acryloyl group, include the compounds listed as examples above.

When the unsaturated compound contains compound (i) and compound (ii), preferably, compound (i) is present in an amount of 1 to 50 mass % and compound (ii) is present in an amount of 99 to 50 mass %; more preferably, compound (i) is present in an amount of 1 to 30 mass % and compound (ii) is present in an amount of 99 to 70 mass %; and particularly preferably, compound (i) is present in an amount of 1 to 20 mass % and compound (ii) is present in an amount of 99 to 80 mass %, based on the total amount of compound (i) and compound (ii) taken as 100 mass % from the standpoint of excellent elongation and adhesion of the cured coating film.

(1-2-2) Other Components

The electron beam-curable composition may contain one or more other components that are commonly added to a coating material (paint).

Other components that can be preferably added include volatile components, such as water and organic solvents; colorants, such as pigments and dyes; dispersants; rheology control agents; and UV absorbers.

The following describes volatile components, colorants, dispersants, rheology control agents, UV absorbers, light stabilizers, and surface adjusting agents.

The phrase "total resin solids content in the composition" below refers to the unsaturated compound. When the electron beam-curable composition contains a polymer as another component, the total resin solids content in the composition refers to the total content of the unsaturated compound and the polymer.

Volatile Component

The composition for use in the present invention may be a non-aqueous composition or a solvent-free composition that contains only an unsaturated compound. However, the composition may contain a volatile component for the purpose of reducing the viscosity and improving the coatability, for example.

Examples of volatile components include water and organic solvents.

Specific examples of organic solvents include alcohol compounds, such as methanol, ethanol, isopropanol, and butanol; alkylene glycol monoether compounds, such as ethylene glycol monomethyl ether and propylene glycol monomethyl ether; acetone alcohols, such as diacetone alcohols; aromatic compounds, such as benzene, toluene, and xylene; ester compounds, such as propylene glycol monomethyl ether acetate, ethyl acetate, and butyl acetate; ketone compounds, such as acetone, methyl ethyl ketone, and methyl isobutyl ketone; ether compounds, such as dibutyl ether; and N-methylpyrrolidone.

A composition that contains water as a volatile component is preferable for use in the present invention, because such a composition is suitable for spray-coating.

When the composition contains a volatile component, the content of the volatile component in the composition is preferably 1 mass % to 90 mass %, more preferably 1 mass % to 80 mass %, and particularly preferably 1 mass % to 50 mass % from the standpoint of excellent spray-coatability, reducing drying energy, and shortening the drying time in the method for producing a coated material.

Colorant

To add a color to the obtained cured coating film, a colorant may be added to the composition.

Examples of colorants include pigments and dyes, with pigments being preferable for use.

The pigment for use is preferably an effect pigment. Examples of effect pigments include metals, such as aluminum, aluminum oxide, copper, zinc, iron, nickel, and tin; and uncolored or colored metallic effect agents such as alloy. Metal-deposition-film flakes are also preferable for use. Examples of effect pigments also include mica, mica that is surface-coated with metal oxide, mica-like iron oxide, graphite pigments, and holographic pigments.

These pigments can be used singly, or in a combination of two or more.

The pigment for use may have any shape, and may further be colored. The pigment may also be those treated with a variety of surface treatment agents or dispersants. A pigment that has a volume average particle size (D50) of, for example, about 2 μm to 50 μm (major axis) and a thickness of about 0.1 μm to 5 μm is preferable for use. In particular, a pigment that has a volume average particle size (D50) of about 10 μm to 35 μm (major axis) is particularly preferable for use due to excellent brilliance.

The pigment is preferably mixed with a dispersant (pigment dispersant) and dispersion resin to disperse the pigment, and formed into a paste to be added to a paint composition.

The amount of the pigment to be contained in the composition can be suitably determined according to the purpose. The content of the pigment in the composition is preferably 0.5 parts by mass to 30 parts by mass, and more preferably 1 part by mass to 20 parts by mass, based on the total resin solids content taken as 100 parts by mass in the composition. A pigment dispersant is used in an amount of preferably 10 parts by mass to 90 parts by mass, and more preferably 20 parts by mass to 80 parts by mass, based on the pigment taken as 100 parts by mass.

Dispersant

When a pigment is added as a colorant to the electron beam-curable composition, it is preferable to add a dispersant (pigment dispersant).

The pigment dispersant can be any pigment dispersant, and can be selected from a variety of pigment dispersants.

Specific examples of pigment dispersants for use include amide compounds, such as nonanamide, decaneamide, dodecaneamide, N-dodecyl hexaamide, N-octadecyl propioamide, N,N-dimethyl dodecaneamide, and N,N-dihexyl acetamide; amine compounds, such as diethyl amine, diheptyl amine, dibutyl hexadecyl amine, N,N,N',N'-tetramethyl methane amine, triethyl amine, tributylamine, and trioctyl amine; hydroxy-containing amines, such as monoethanolamine, diethanolamine, triethanolamine, N,N,N',N'-(tetrahydroxyethyl)-1,2-diamino ethane, N,N,N'-tri(hydroxyethyl)-1,2-diaminoethane, N,N,N',N'-tetra(hydroxyethyl polyoxyethylene)-1,2-diaminoethane, 1,4-bis(2-hydroxyethyl)piperazine, and 1-(2-hydroxyethyl)piperazine; and compounds, such as nipecotamide, isonipecotamide, and nicotinamide.

Additionally, examples of pigment dispersants for use include (co)polymers of unsaturated carboxylic acid esters, such as polyacrylic acid ester; (partial) amine salts, (partial) ammonium salts, or (partial) alkyl amine salts of (co) polymers of unsaturated carboxylic acid ester, such as polyacrylic acid; (co)polymers of hydroxy-containing unsaturated carboxylic acid ester, such as hydroxy-containing polyacrylic acid ester, and modified products thereof; polyurethanes; unsaturated polyamides; polysiloxanes; long-chain polyaminoamide phosphates; and amides obtained by reacting poly(lower alkyleneimine) with free carboxyl-containing polyester, and salts thereof.

Examples of commercially available products of dispersants include Shigenox-105 (trade name, produced by Hakkol Chemical); Disperbyk-101, Disperbyk-130, Disperbyk-140, Disperbyk-170, Disperbyk-171, Disperbyk-182, Disperbyk-2001 (all produced by BYK-Chemie Japan); EFKA-49, EFKA-4010, EFKA-9009 (all produced by Efka Chemicals); Solsperse 12000, Solsperse 13240, Solsperse 13940, Solsperse 17000, Solsperse 20000, Solsperse 24000GR, Solsperse 24000SC, Solsperse 27000, Solsperse 28000, Solsperse 33500 (all produced by Zeneca PLC); and PB821 and PB822 (both produced by Ajinomoto Fine-Techno Co., Inc.).

Rheology Control Agent

Preferably, the electron beam-curable composition optionally contains a rheology control agent.

The rheology control agent for use may be a known rheology control agent, and may be, for example, a thickening agent, such as polyethylene oxide and fatty acid amide wax, and a known additive as an anti-settling agent. Examples of rheology control agents include alkoxy silyl compounds, condensates thereof, polyurea compounds, organic fine particles such as non-water-dispersing resins, and inorganic fine particles.

The composition containing such a rheology control agent has thixotropy, and usable rheology control agents include those that exhibit viscosity when a shear force is not applied. Thus, when the composition contains a pigment, a rheology control agent can exert a stronger action of decreasing the misorientation of the pigment, and improves metallic appearance.

The organic fine particles for use as a rheology control agent are preferably resin particles, such as known polymer beads; those obtained by pulverizing polymerized products of monomers; and gelled polymer fine particles (see, for example, JPH03-66770 and JPH06-70110).

Specific examples of the organic fine particles for use include a non-aqueous dispersion of gelled polymer fine particles obtained by copolymerizing and crosslinking a vinyl monomer mixture in an organic solvent that can dissolve macromonomer (a), macromonomer (b), and the vinyl monomer, but that substantially does not dissolve the polymer of the vinyl monomer in the presence of a mixture of macromonomer (a) and macromonomer (b). Macromonomer (a) has a molecular chain of poly(12-hydroxystearic acid) and about at least one polymerizable unsaturated double bond per molecule on average, as disclosed in JPH06-70110. Macromonomer (b) has about 1.0 to 1.5 polymerizable unsaturated double bonds per molecule on average. The vinyl monomer mixture contains at least 0.5 mass % of at least two vinyl monomers that each have complementary functional groups that can react and bind to each other. Such organic fine particles have a high cross-linking density, and are substantially non-swelling and non-fusing even in an organic solvent that can highly dissolve a polymer, such as toluene or ethyl acetate.

Adding organic fine particles to the composition containing a volatile component enables preferable preparation of a solution (dispersion) with a high resin content (i.e., a high solids content) substantially without increasing the viscosity of the composition.

The organic fine particles have a volume average particle size (D50) of typically about 0.01 μm to 2 μm, and particularly preferably about 0.05 μm to 0.5 μm. Organic fine particles having a volume average particle size within these ranges lead to a coating film excellent in a sagging prevention effect, and finished appearance (metallic appearance).

The inorganic fine particles for use as a rheology control agent are preferably inorganic oxide particles, such as colloidal, or amorphous silica or alumina.

The rheology control agent for use as an additive may be a known commercially available product, and is preferably Celny HPC-H, HPC-M, HPC-L, HPC-SL, HPC-SSL (all produced by Nippon Soda Co., Ltd.); Dianal BR series (produced by Mitsubishi Rayon Co., Ltd.); Disparlon #6900-10X, Disparlon #6900-20X, Disparlon #4200, Disparlon KS-873N, Disparlon #1850 (all produced by Kusumoto Chemicals, Ltd.); BYK-405, BYK-410 (both produced by BYK-Chemie Japan); Primal RW-12W (produced by Rohm and Haas Company); A-S-AT-20S, A-S-AT-350F, A-S-AD-10A, A-S-AD-160 (all produced by Itoh Oil Chemicals Co., Ltd.); or SetaluxC-7176VB-60 (produced by Akzo Nobel N.V.).

When a rheology control agent is added to the composition, the content of the rheology control agent is preferably 40 parts by mass or less, and more preferably 2 parts by mass to 20 parts by mass, based on the total resin solids content taken as 100 parts by mass in the composition from the standpoint of viscosity development action and finished appearance. From the standpoint of finished appearance and an increased solids content, the organic fine particles for use as a rheology control agent are added in an amount of preferably 40 parts by mass or less, and more preferably 2 parts by mass to 20 parts by mass, based on the total resin solids content taken as 100 parts by mass in the composition.

UV Absorber

The composition optionally may further contain one UV absorber, or a combination of two or more UV absorbers, that can be used as a typical additive for paint (e.g., a benzotriazole-based absorber, a triazine-based absorber, a salicylic acid derivative-based absorber, and a benzophenone-based absorber).

The UV absorber for use is preferably a commercially available product, such as Tinuvin 900, Tinuvin 928, Tinuvin 348-2, Tinuvin 479, Tinuvin 405 (produced by BASF, trade name, Tinuvin is registered trademark); and RUVA93 (trade name, produced by Otsuka Chemical Co., Ltd.).

The content of one or more UV absorbers in the composition can be any content. From the standpoint of adhesion with a substrate and weatherability, a suitable content of one or more UV absorbers in the composition is 0.1 parts by mass to 15 parts by mass, and preferably 0.3 parts by mass to 10 parts by mass, based on the total resin solids content taken as 100 parts by mass in the composition.

Light Stabilizer

The composition may optionally further contain one light stabilizer, or a combination of two or more light stabilizers, that can be used as a typical additive for paint (e.g., hindered piperidines).

The light stabilizer is preferably a commercially available product, such as Tinuvin 123, Tinuvin 152, Tinuvin 292 (all produced by BASF, trade name, Tinuvin is a registered trademark); Hostavin 3058 (trade name, produced by Clariant AG, Hostavin is a registered trademark); and Adeka Stab LA-82 (Adeka Stab, trade name, produced by ADEKA Corporation, Adeka Stab is a registered trademark).

When one or more light stabilizers are added to the composition, the content of the one or more light stabilizers can be any content. From the standpoint of weatherability, the content of the one or more light stabilizers is preferably 0.1 parts by mass to 10 parts by mass, and more preferably 0.2 parts by mass to 5 parts by mass, based on the total resin solids content taken as 100 parts by mass in the composition.

Surface Adjusting Agent

The composition may optionally further contain one surface adjusting agent, or a combination of two or more surface adjusting agents, that can be used as a typical additive for paint (e.g., an acrylic surface adjusting agent, a silicon-based surface adjusting agent, a fluorine-based surface adjusting agent, and a vinyl-based surface adjusting agent).

The silicon-based surface adjusting agent for use is preferably a commercially available product, such as BYK-300, BYK-302, BYK-306, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (all produced by BYK-Chemie Japan, trade name); 1711, 1751N, 1761, LS-001, LS-050 (all produced by Kusumoto Chemicals, Ltd., DISPARLON series); Glanol 100, Glanol 115, Glanol 200, Glanol 400, Glanol 410, Glanol 440, Glanol 435, Glanol 450, Glanol 482, Glanol B-1484, and Polyflow ATF-2 (trade name, all produced by TEGO).

The acrylic surface adjusting agent for use is preferably a commercially available product, such as BYK-350, BYK-352, BYK-354, BYK-355, BYK-358N, BYK-361N, BYK-392 (trade name, all produced by BYK-Chemie Japan); OX-880EF, OX-881, OX-883, OX-883HF, OX-70, OX-77EF, OX-60, OX-710, OX-720, OX-720EF, OX-750HF, LAP-10, LAP-20, LAP-30, 1970, 230, LF-1980, LF-1982, LF-1983, LF-1984, LF-1985, LHP-95, LHP-96 (all produced by Kusumoto Chemicals, Ltd., DISPARLON series); Polyflow No. 3, Polyflow No. 7, Polyflow No. 50E, Polyflow No. 50EHF, Polyflow No. 54N, Polyflow No. 55, Polyflow No. 64, Polyflow No. 75, Polyflow No. 77, Polyflow No. 85, Polyflow No. 85HF, Polyflow No. S, Polyflow No. 90, Polyflow No. 90D-50, Polyflow No. 95, Polyflow No. 300, Polyflow No. 460, Polyflow WS, Polyflow WS-30, and Polyflow WS-314 (trade name, all produced by Kyoeisha Chemical Co., Ltd.).

The vinyl-based surface adjusting agent for use is preferably a commercially available product, such as LHP-90LHP-91 (produced by Kusumoto Chemicals, Ltd., ISPARLON series).

Other surface adjusting agents for use are preferably commercially available products, such as BYK-340, which is a fluorine-modified polymer; and BYK-SILCLEAN 3700, which is a silicon-modified polymer (trade name, both produced by BYK-Chemie Japan).

Of the surface adjusting agents, the use of a silicon-based surface adjusting agent can minimize the difference in surface tension, and increase the surface tension homogenization effect.

Of the surface adjusting agents, the use of an acrylic surface adjusting agent can improve compatibility and finished appearance.

These surface adjusting agents may be used singly, or in a combination of two or more.

The composition may optionally further contain one or a combination of two or more diluents, color pigments (e.g., titanium oxide, carbon black, phthalocyanine blue, quinacridone red, azo-based color pigments, and quinacridone-based color pigments), extender pigments (e.g., silica, baryta, and talc), antifoaming agents, antirust agents, plasticizers, organic solvents, and the like that can be used as typical additives for paint.

When a surface adjusting agent is added to the composition, the content of the surface adjusting agent can be any content. From the standpoint of smoothness of the coating film, the content of the surface adjusting agent is preferably 0.1 parts by mass to 10 parts by mass, and more preferably 0.2 parts by mass to 6 parts by mass, based on the total resin solids content taken as 100 parts by mass in the composition.

(1-2-3) Composition Viscosity

The electron beam-curable composition has a viscosity of preferably 1 Pa·s to 300 Pa·s, and more preferably 10 Pa·s to 100 Pa·s as measured at a shear rate of 0.1/s.

A composition having a viscosity within these ranges is preferable because such a composition does not run downward from a vertical surface, and has surface smoothness (leveling properties).

Additionally, the electron beam-curable composition preferably has a viscosity of 1 Pa·s to 300 Pa·s as measured at a shear rate of 0.1/s, and a viscosity of 0.01 Pa·s to 0.3 Pa·s as measured at a shear rate of 1,000/s.

Additionally, the electron beam-curable composition more preferably has a viscosity of 10 Pa·s to 100 Pa·s as measured at a shear rate 0.1/s, and a viscosity of 0.03 Pa·s to 0.1 Pa·s as measured at a shear rate of 1,000/s.

The term "viscosity" as used herein refers to a value measured in accordance with a measurement method using a rotary viscometer, which is a value determined by measuring a viscosity with a rotary viscometer at 25.0±1.0° C. by continuously changing the shear rate from 0.01/s to 1,000/s.

Preferable Embodiment of Electron Beam-Curable Composition

The composition preferably contains a volatile component, because spray-coating becomes possible in the method for producing a coated material according to the present invention.

Additionally, the composition is preferably an aqueous dispersion that uses water as a volatile component in which an unsaturated compound is dispersed. When the composition is an aqueous dispersion, it is preferable to use an emulsifier by which the unsaturated compound is dispersed.

(1-3) Coating Method

In step (1), the electron beam-curable composition containing an unsaturated compound is applied to a substrate.

The coating method can be suitably determined according to the purpose. Examples of coating methods include spray, bar coater, applicator, doctor blade, dip coater, roll coater, spin coater, flow coater, knife coater, comma coater, reverse roll coater, die coater, lip coater, gravure coater, microgravure coater, and inkjet.

In step (1), the electron beam-curable composition containing an unsaturated compound is preferably applied to a substrate by spray-coating.

The amount of the composition applied in the present invention can be suitably determined according to the intended use. After the volatile component such as an organic solvent is dried, the coating film has a thickness of typically about 1 μm to 200 μm, preferably 1 μm to 100 μm, and more preferably 5 μm to 50 μm.

(1-4) Viscosity of Coating Film

In step (1), a coating film having a surface viscosity of 1 Pa·s to 300 Pa·s (millipascal-second) as measured based on an electric-field pickup method is formed on a substrate.

The electric-field pickup method refers to a method for measuring the viscosity of liquid in accordance with the following principle, as disclosed in PTL 1 (JP 2011-84699) cited in the Background Art section.

FIG. 1 is a conceptual diagram that conceptually illustrates the principle of the electric-field pickup method. "P1" in FIG. 1 indicates a paint, and the upper part thereof indicates an air layer (an air layer). "N" in FIG. 1 indicates an electrode needle. Electrode needle N is arranged upright with respect to the liquid level of paint P1; and the distance between the tip of electrode needle N and the liquid level of paint P1 is, for example, 10 μm. The chart on the left in FIG. 1 illustrates the case in which a voltage is not applied to electrode needle N. The chart on the right in FIG. 1 illustrates the case in which a voltage is applied to electrode needle N.

When a predetermined voltage is applied to electrode needle N, electric charges are accumulated at the tip of electrode needle N. This generates, near the liquid level of paint, an electric field that draws an electric line of force that becomes substantially vertical on the liquid level from electrode needle N and allows Maxwell stress to act inside and outside of paint P1, which is a liquid. At this stage, due to the difference in permittivity between paint P1, which is a liquid, and the air layer, a force is generated on the surface and causes deformation. Because paint P1, due to the form of liquid, has a higher permittivity, the liquid level rises as if the liquid was pulled up, as illustrated on the right side of FIG. 1. The shape of the risen liquid level is determined by the balance between Maxwell stress and surface tension, and the rate of deformation correlates to the viscosity. Thus, the surface tension and viscosity can be determined by observing the deforming shape, and measuring the rate of deformation.

The electric-field pickup method broadly indicates a method for measuring a viscosity based on the information obtained by observing the change in shape of the surface of a coating film due to Maxwell stress generated by the difference in permittivity between an air layer and a liquid layer when an electric field that passes through in the direction substantially perpendicular to the interface between the air layer and the liquid layer (paint) is generated near the coating film. The electric-field pickup method should not be interpreted in a narrow sense.

From the standpoint of preventing the coating film from running downward until the coating film is cured by electron beam irradiation in the following step 3, the coating film formed from the composition for use in the present invention has a surface viscosity of 1 Pa·s to 300 Pa·s as measured at 20° C., and preferably 10 Pa·s to 300 Pa·s on a dry coating film basis based on the electric-field pickup method.

A coating film that has a viscosity of less than 1 Pa·s tends to run downward. When the viscosity exceeds 300 Pa·s, the leveling properties become poor; this is likely to impair the surface smoothness of the ultimately obtained cured coating film.

(2) Step (2)

In step (2) of the method for producing a coated material according to the present invention, when the electron beam-curable composition contains a volatile component, the coating film obtained in step (1) is dried to form a dry coating film.

The drying conditions in step (2) can be suitably determined according to the type of the volatile component.

When an aqueous dispersion is used as an electron beam-curable composition to form a coating film in step (1), step (2) is preferably a step in which the volatile component contained in the electron beam-curable composition in the coating film is evaporated to form a dry coating film.

The drying method can be suitably selected according to the type of the electron beam-curable composition. For example, when water is used as a volatile component for the electron beam-curable composition, the composition becomes an aqueous dispersion. Thus, it is preferable to dry the coating film at a temperature of about 40° C. to 80°.

(3) Step (3)

In step (3) of the method for producing a coated material according to the present invention, the substrate having the coating film obtained in step (1) or the dry coating film obtained in step (2) is irradiated with electron beams in an inert gas atmosphere to form a cured coating film.

Inert Gas

In step (3) in which a cured coating film is formed, the coating film or the dry coating film can be smoothly cured by irradiating the film with electron beams in an inert gas atmosphere, even in a shadowed portion of the substrate; or even when the substrate has an uneven portion, curved portion, and/or bent portion.

Examples of inert gases include nitrogen gas and noble gas, such as helium and argon. The inert gas preferably has an oxygen concentration of 0.1% by volume or less. Additionally, the inert gas preferably contains nitrogen gas as the main component, and has an oxygen concentration of 0.1% by volume or less.

Electron Beam

The electron beam irradiation conditions in forming a cured coating film in step (3) can be suitably selected according to the type and purpose of the electron beam-curable composition for use.

The electron beam is preferably emitted such that the accelerating voltage is 80 kV to 300 kV, and such that the absorbed dose is 10 kGy to 1,000 kGy. This can increase the polymerization rate after electron beam irradiation. An accelerating voltage and an absorbed dose that are less than the lower limits and that exceed the upper limits are not preferable. This is because an accelerating voltage and an absorbed dose that are less than the lower limits make the hardness improvement effect insufficient, while an accelerating voltage and an absorbed dose that exceed the upper limits make the cured coating film brittle. Irradiation conditions other than the accelerating voltage and absorbed dose can be suitably determined, for example, according to the composition and substrate for use, and the purpose.

The temperature at which electron beams are emitted is preferably 10° C. to 50° C.

The device for emitting electron beams for use can be a typical device, and is preferably a device that has an electron beam irradiation unit and a transport unit for delivering a substrate having a dry coating film to be irradiated with electron beams.

Cured Coating Film

The cured coating film obtained by irradiating a coating film with electron beams in an inert gas atmosphere in step (3) preferably has an elongation at break of 5% or more.

The elongation at break in the present invention refers to a value measured in accordance with JIS K 6251 "Rubber, vulcanized or thermoplastic—Determination of tensile stress-strain properties."

(4) Two or More Cured Coating Films

The method for producing a coated material according to the present invention can also be used in producing a coated material that contains two or more cured coating films.

Specifically, the method for producing a coated material according to the present invention also relates a method for producing a coated material by which two or more cured coating films are formed, wherein two or more electron beam-curable compositions each containing an ethylenically unsaturated group-containing compound for forming a cured coating film are used; and after a series of step (1) and step (2) is performed at least two times, step (3) is performed.

In this case, first, the step of applying an electron beam-curable composition for forming a first cured coating film to a substrate to form a coating film (step (1)) is performed.

Subsequently, the step of drying the coating film to form a dry coating film when the electron beam-curable composition for forming a first cured coating film contains a volatile component (step (2)) is performed.

Subsequently, the step of applying an electron beam-curable composition for forming a second cured coating film to the coating film obtained in step (1) or to the dry coating film obtained in step (2) to form a coating film having a surface viscosity of 1 Pa·s to 300 Pa·s as measured based on the electric-field pickup method (step (1)) is performed.

Subsequently, the step of drying the coating film to form a dry coating film when the electron beam-curable composition for forming a second cured coating film contains a volatile component (step (2)) is performed.

In the case of a coated material that contains three or more cured coating films, steps (1) and (2) are further repeated as necessary to form coating films or dry coating films of two or more electron beam-curable compositions on the substrate.

After these steps, the step of irradiating the substrate that has two or more coating films and/or dry coating films with electron beams to form at least two cured coating films (step (3)) is performed.

Examples of multilayer cured coating films include a three-layered cured coating film formed of an intermediate composition, a base composition, and a clear composition on a substrate.

[2] Coated Material and Automotive Substrate

The method for producing a coated material according to the present invention can be used in producing coated materials for a variety of applications.

The coated material according to the present invention is preferably used in substrates for automobiles.

The method for producing a coated material according to the present invention can produce a cured coating film having a thickness of preferably 5 μm to 500 μm, more preferably 10 μm to 150 μm, in particular when a substrate for automobiles is produced.

EXAMPLES

The following describes the present invention with reference to the method for producing a coated material in Examples. In the Examples below, "parts" indicates parts by mass.

1. Measurement Method (1) Method for Measuring Viscosity of Electron Beam-Curable Composition An ARES-G2 rheometer (produced by TA Instruments), which is a rotary viscometer, was used. The viscosity of an electron beam-curable composition was measured with the rotary viscometer at 25.0±1.0° C. by continuously changing the shear rate from 0.01/s to 1,000/s.

(2) Method for Measuring Surface Viscosity of Coating Film

The surface viscosity of a coating film formed by applying an electron beam-curable composition to a substrate was measured with an electric-field pickup viscometer (produced by Kyoto Electronics Manufacturing Co., Ltd., trade name: RM-01T).

(3) Evaluation of Cured Coating Film

Elongation at Break (%)

A cured coating film was punched with a No. 3 dumbbell mold to prepare a test specimen. In accordance with JIS K 6251 "Rubber, vulcanized or thermoplastic—Determination of tensile stress-strain properties," this test specimen was measured for tensile strength at yield, tensile strength at break, and tensile elongation at break. The measurement was performed at 23° C. at 60% RH at a tension rate of 5 mm/min, with a capture distance of 50 mm and a sample width of 10 mm.

Curing State

The cured coating film was visually observed and rated as "A" when the obtained cured coating film was unclouded and transparent.

2. Production Example (1) Production Examples 1 to 8

The unsaturated compounds shown in the following Tables 1 and 2 were mixed with stirring, thereby obtaining solvent-free electron beam-curable compositions. The viscosity of the obtained electron beam-curable compositions was measured. Tables 1 and 2 show the results.

TABLE 1

| Production Example | | 1 | 2 | 3 | 4 | 5 |
|---|---|---|---|---|---|---|
| Unsaturated Compound (Part) | M-7100 | 50 | 45 | 40 | 35 | 30 |
| | M-5700 | 50 | 55 | 60 | 65 | 70 |
| | M-327 | — | — | — | — | — |
| | M-305 | — | — | — | — | — |
| Viscosity | 0.1/s (Pa · s) | 5.1 | 4.6 | 4.1 | 3.6 | 3.1 |

TABLE 2

| Production Example | | 6 | 7 | 8 |
|---|---|---|---|---|
| Unsaturated Compound (Part) | M-7100 | — | — | 30 |
| | M-5700 | — | — | — |
| | M-327 | 90 | 95 | 70 |
| | M-305 | 10 | 5 | — |
| Viscosity | 0.1/s (Pa · s) | 2.0 | 2.1 | 4.5 |

Abbreviations in Tables 1 and 2
M-7100: Polyester acrylate, produced by Toagosei Co., Ltd., Aronix M-7100
M-5700: 2-Hydroxy-3-phenoxypropyl acrylate, produced by Toagosei Co., Ltd., Aronix M-5700
M-327: Triacrylate with 3 mol of an ethylene oxide isocyanuric adduct with respect to 3 mol of a ε-caprolactone adduct, produced by Toagosei Co., Ltd., Aronix M-327
M-305: A mixture of pentaerythritol triacrylate and tetraacrylate, produced by Toagosei Co., Ltd., Aronix M-305

(2) Production Examples 9 to 11

The unsaturated compound and volatile component shown in Table 3 were mixed with stirring; and an emulsifier (polyoxyethylene polycyclic phenyl ether, produced by Nippon Nyukazai Co., Ltd., Newcol 740) was added, followed by dispersing the components with a homogenizer. The dispersion was further mixed with other components with stirring, thereby obtaining an aqueous electron beam-curable composition.

The M-1200 used in Production Example 9 is highly viscous, and was diluted with ethyl acetate beforehand to decrease its viscosity. After the components were dispersed in water, ethyl acetate was removed at room temperature under reduced pressure.

The obtained compositions were measured for viscosity. Table 3 shows the results.

TABLE 3

| Production Example | | 9 | 10 | 11 |
|---|---|---|---|---|
| Unsaturated Compound (Part) | M-1200 | 250 | — | — |
| | M-5700 | — | 250 | — |
| | M-7100 | — | — | 250 |
| Volatile Component (Part) | Ethyl Acetate | 60 | — | — |
| | Ion-Exchanged Water | 250 | 250 | 250 |
| Other Component (Part) | Newcol 740 | 2.5 | 2.5 | 2.5 |
| | BYK-346 | 2.5 | 2.5 | 2.5 |
| | Voncoat HV-E | 6 | 6 | 6 |
| | DMAE | 1.2 | 1.2 | 1.2 |
| | Ethyl Acetate removed | -60 | — | — |
| Viscosity | 0.1/s (Pa · s) | 15.7 | 14.5 | 13.9 |
| | 1,000/s (Pa · s) | 0.08 | 0.07 | 0.08 |

Abbreviations in Table 3
The abbreviations other than those defined above indicate the following.
M-1200: Urethane acrylate, produced by Toagosei Co., Ltd., Aronix M-1200
Newcol 740: An emulsifier (polyoxyethylene polycyclic phenyl ether), produced by Nippon Nyukazai Co., Ltd., Newcol 740
BYK-346: A silicon-based surfactant, produced by BYK-Chemie Japan, BYK-346
Voncoat HV-E: A thickening agent, produced by DIC Corporation, Voncoat HV-E
DMAE: Dimethylaminoethanol (3) Production Example 12

The components shown in the following Table 4 were used in the ratio shown in Table 4. In accordance with the method used in Production Examples 9 to 11, a composition was prepared, thereby preparing composition C-1, which is a clear paint (aqueous emulsion).

The viscosity of the obtained composition was measured. Table 4 shows the results.

TABLE 4

| Production Example | | 12 |
|---|---|---|
| Unsaturated Compound (Part) | M-5700 | 125 |
| | M-7100 | 125 |
| Volatile Component (Part) | Ion-Exchanged Water | 250 |
| Other Component (Part) | Newcol 740 | 2.5 |
| | BYK-346 | 2.5 |
| | Voncoat HV-E | 6 |
| | DMAE | 1.2 |
| Viscosity | 0.1/s (Pa · s) | 11.2 |
| | 1,000/s (Pa · s) | 0.08 |

(4) Production Example 13

The components shown in the following Table 5 were used in the ratio shown in Table 5. In accordance with the method used in Production Examples 9 to 11, a composition was prepared, thereby preparing composition B-1, which is an aluminum pigment-containing base paint.

The viscosity of the obtained composition was measured. Table 5 shows the results.

TABLE 5

| Production Example | | 13 |
|---|---|---|
| Production Example 12: C-1 (Part) | | 512.2 |
| Volatile Component (Part) | 2-Propanol | 15 |
| | Ion-Exchanged Water | 330 |
| Other Component (Part) | Alpaste WXM 5660 | 50 |
| | Voncoat HV-E | 6 |
| | DMAE | 2 |
| Viscosity | 0.1/s (Pa · s) | 12.5 |
| | 1,000/s (Pa · s) | 0.06 |

Abbreviations in Table 5
The abbreviation other than those defined above indicates the following.
Alpaste WXM5660: Aqueous Alpaste, produced by Toyo Aluminium K.K., Alpaste WXM5660

(5) Production Example 14

The components shown in the following Table 6 were used in the ratio shown in Table 6. In accordance with the method used in Production Examples 9 to 11, a composition was prepared, thereby preparing composition P-1, which is a titanium pigment-containing intermediate paint.

The viscosity of the obtained composition was measured. Table 6 shows the results.

TABLE 6

| Production Example | | 14 |
|---|---|---|
| Production Example 12: C-1 (Part) | | 512.2 |
| Volatile Component (Part) | Ion-Exchanged Water | 380 |
| Other Component (Part) | Tipaque CR-97 | 240 |
| | MA-100 | 1.2 |
| | DISPER BYK-180 | 12 |
| | Voncoat HV-E | 1 |
| | DMAE | 0.2 |
| Viscosity | 0.1/s (Pa · s) | 22.2 |
| | 1,000/s (Pa · s) | 0.06 |

Abbreviations in Table 6

The abbreviations other than those defined above indicate the following.

Tipaque CR-97: Titanium oxide, produced by Ishihara Sangyo Kaisha, Ltd., Tipaque CR-97
MA-100: Carbon black, produced by Mitsubishi Chemical Corporation, MA-100
DISPERBYK-180: Dispersant, produced by BYK-Chemie Japan, DISPERBYK-180

3. Examples

(1) Examples 1 to 8

(1-1) Step 1

The electron beam-curable compositions obtained in Production Examples 1 to 8 were used. The electron beam-curable compositions were each applied to a glass plate so as to give a thickness of 50 μm. The coating films formed after the compositions were applied to the substrates were measured for surface viscosity.

(1-2) Step 3

Each substrate having the obtained coating film thereon was irradiated with electron beams using an electron beam irradiator (produced by NHV Corporation) at an accelerating voltage of 150 kV and a dose of 30 kGy (adjusted by a beam current and travelling velocity) with an oxygen concentration of 300 ppm or less at room temperature (23° C.), thereby obtaining a cured coating film. This cured coating film is referred to as "specimen."

The obtained specimens were evaluated for elongation at break and curing state. Table 7 shows the results.

TABLE 7

| | | Surface | Evaluation Results | |
|---|---|---|---|---|
| Example | Composition | Viscosity (Pa · s) | Elongation at Break (%) | Curing State |
| 1 | Production Example 1 | 5.3 | 5 | A |
| 2 | Production Example 2 | 4.5 | 5 | A |
| 3 | Production Example 3 | 4.0 | 6 | A |
| 4 | Production Example 4 | 3.7 | 8 | A |
| 5 | Production Example 5 | 3.1 | 23 | A |
| 6 | Production Example 6 | 2.1 | 5 | A |
| 7 | Production Example 7 | 2.0 | 6 | A |
| 8 | Production Example 8 | 4.6 | 5 | A |

(2) Examples 9 to 11

(2-1) Step 1

The electron beam-curable compositions obtained in Production Examples 9 to 11 were used. The electron beam-curable compositions were each applied to a glass plate such that the coating films had a thickness of 40 μm after drying at 80° C. for 3 minutes. The coating films formed after the compositions were applied to the substrates were measured for surface viscosity.

(2-2) Step 2

After coating, the formed films were heated at 80° C. for 3 minutes with a hot-air drying oven to evaporate the volatile component in the compositions, thereby obtaining dry coating films.

(2-3) Step 3

Each substrate having the obtained dry coating film thereon was irradiated with electron beams using the same irradiator as in the previous Example under the same irradiation conditions, thereby obtaining a cured coating film. This cured coating film is referred to as "specimen."

The obtained specimens were evaluated for elongation at break and curing state. Table 8 shows the results.

TABLE 8

| | | Surface | Evaluation Results | |
|---|---|---|---|---|
| Example | Composition | Viscosity (Pa · s) | Elongation at Break (%) | Curing State |
| 9 | Production Example 9 | 16.8 | 90 | A |
| 10 | Production Example 10 | 15.3 | 200 to 300 | A |
| 11 | Production Example 11 | 14.8 | 5 | A |

(3) Example 12

The electron beam-curable compositions P-1, B-1, and C-1 obtained in Production Examples 12 to 14 were used; these compositions were aqueous emulsion paints.
Production Example 12: Composition C-1, which is a clear paint (aqueous emulsion).

Production Example 13: Composition B-1, which is an aluminum pigment-containing base paint.
Production Example 14: Composition P-1, which is a titanium pigment-containing intermediate paint.

A coating film composed of three layers formed of an intermediate composition, a base composition, and a clear composition (multilayer cured coating film) was prepared on a substrate.

(3-1) Step 1

First, intermediate paint P-1 was applied to an electrodeposited steel plate (substrate) such that the coating film had a thickness of 40 μm after step 2 of the following section (3-2). The coating film formed after the composition was applied to the substrate was measured for surface viscosity, and the surface viscosity was 23.6 Pa·s.

(3-2) Step 2

After coating, the formed coating film was heated at 80° C. for 3 minutes with a hot-air drying oven to evaporate the volatile component in the composition, thereby obtaining a dry coating film.

(3-3) Step 1

Base paint B-1 was applied to the dry coating film of intermediate paint P-1 obtained above in accordance with the same procedure as above, such that the coating film had a thickness of 40 μm after step 2 of the following section (3-4). The coating film formed after the composition was applied was measured for surface viscosity, and the surface viscosity was 14.9 Pa·s.

(3-4) Step 2

After coating, the formed coating film was heated in the same manner as above to evaporate the volatile component in the composition, thereby obtaining a dry coating film.

(3-5) Step 1

Clear paint C-1 was applied to the dry coating film of base paint B-1 obtained above in accordance with the same procedure as above, such that the coating film had a thickness of 40 μm after step 2 of the following section (3-6).

The coating film formed after the composition was applied was measured for surface viscosity, and the surface viscosity was 13.5 Pa·s.

(3-6) Step 2

After coating, the formed coating film was heated in the same manner as above to evaporate the volatile component in the composition, thereby obtaining a dry coating film.

(3-7) Step 3

The obtained specimen having three dry coating films was irradiated with electron beams using the same irradiator as in the previous Examples under the same irradiation conditions, thereby obtaining a multilayered cured coating film (thickness of three films in total: 120 μm).

The obtained multilayered cured coating film contained a substrate, intermediate paint P-1, base paint B-1, and clear paint C-1 in this order from the substrate. The obtained cured coating films were evaluated for elongation at break and curing state. The curing state of each cured coating film was rated "A."

(4) Example 13

The polypropylene (produced by Nippon Testpanel Co., Ltd.) and surface-treated polypropylene shown in Table 9 were used as substrates. The polypropylene and surface-treated polypropylene were subjected to Dyne pen evaluation.

Evaluation was performed using a Vetaphone Pro-Dyn (trade name, Vetaphone A/S, pen 42Dyn) at 32 to 56 dyn/cm².

In Table 9, "○" and "x" in Dyne pen evaluation indicate the following.
○: Excellent wettability
x: Poor Wettability (4-1) Step 1

The electron beam-curable composition obtained in Production Example 1 was applied to polypropylene such that the coating film had a thickness of 50 μm. The coating film formed after the composition was applied to the substrate was measured for surface viscosity, and the surface viscosity was 5.9 Pa·s.

In the same manner, the electron beam-curable composition was also applied to polypropylene subjected to surface treatment shown in Table 9.

(4-2) Step 2

After coating, the formed coating films were heated at 80° C. for 3 minutes with a hot-air drying oven to evaporate the volatile component in the composition, thereby obtaining dry coating films.

(4-3) Step 3

Each substrate having the obtained dry coating film thereon was irradiated with electron beams using the same irradiator as in the previous Examples under the same irradiation conditions, thereby obtaining a cured coating film. This cured coating film is referred to as "specimen." The obtained specimens were subjected to a simple adhesion test. Specifically, a piece of Scotch tape was pressed hard onto each specimen, and abruptly peeled off at an angle of 45° from the edge of the tape. The degree of peeling of the cured coating film was evaluated.

In Table 9, rating "○" and "x" in the simple adhesion test indicate the following.
○: The cured coating film was not peeled off.
x: The cured coating film was peeled off.

TABLE 9

| Example | Surface Treatment | Dyne Pen Evaluation (42 dyn/cm²) | Simple Adhesion Test |
|---|---|---|---|
| 13-1 | None | x | x |
| 13-2 | Flame | ○ | ○ |
| 13-3 | Plasma | ○ | ○ |

(5) Example 14

(5-1) Steps 1 and 2

The electron beam-curable composition obtained in Production Example 1 was applied to an acrylic plate (produced by Mitsubishi Chemical Corporation, Acrylite) under the same conditions as in Example 1, such that the coating film had a thickness of 50 μm; and then the composition was dried.

(5-2) Step 3

Figure 2:
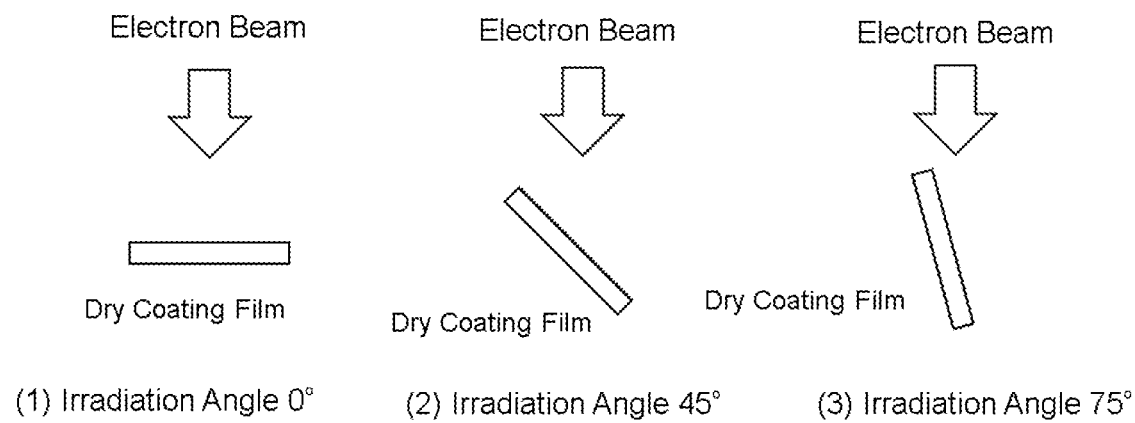
FIG. 2 is a diagram that illustrates an embodiment of the method for producing a coated material according to the present invention (Example 14). In Example 14, the arrangement of the substrate that has a dry coating film thereon was changed.

The substrate having the obtained dry coating film thereon was irradiated with electron beams using the same irradiator as in the previous Examples under the same irradiation conditions, except that the acrylic plate having the dry coating film was arranged at three angles of 0°, 45°, and 75° as shown in FIG. 2, thereby obtaining a cured coating film. Irradiated at any angle, the cured coating film was excellent in its cured state.

INDUSTRIAL APPLICABILITY

The present invention can produce a coated material by using a composition that can be spray-coated, and that does not run downward after coating (i.e., rheology controllable). The present invention can produce a coated material preferably by using a composition that can be cured by electron beams in a short period of time. The present invention can produce a coated material preferably by using a composition that can be suitably cured along the intricate shape of an irradiated substrate (e.g., the body of an automobile). The present invention can produce a coated material preferably by using compositions that can be cured simultaneously when two or more coating films are formed. The present invention can produce a coated material preferably by using a composition that can be cured well when the electron beam-curable composition for use contains a volatile component (e.g., an aqueous dispersion composition).

The invention claimed is:

1. A method for producing a coated material, the method comprising the following steps (1) to (3):
   step (1) of applying an electron beam-curable composition containing an ethylenically unsaturated group-containing compound and a volatile component to a substrate to form a coating film that has a surface viscosity of 1 Pa·s to 300 Pa·s as measured based on an electric-field pickup method,
   step (2) of drying the coating film obtained in step (1) to form a dry coating film, and
   step (3) of irradiating the substrate that has the dry coating film obtained in step (2) with an electron beam in an inert gas atmosphere to form a cured coating film,
   wherein the electron beam-curable composition in step (1) has a viscosity of 10 Pa·s to 300 Pa·s as measured at a shear rate of 0.1/s with a rotary viscometer.

2. The method for producing a coated material according to claim 1, wherein the cured coating film obtained after step (3) has an elongation at break of 5% or more.

3. The method for producing a coated material according to claim 1, wherein the electron beam-curable composition in step (1) has the viscosity of 10 Pa·s to 300 Pa·s as measured at a shear rate of 0.1/s, and has a viscosity of 0.01 Pa·s to 0.3 Pa·s as measured at a shear rate of 1,000/s.

4. The method for producing a coated material according to claim 1, wherein in step (1), the electron beam-curable composition for use is in the form of an aqueous dispersion, and the electron beam-curable composition is applied to the substrate by spraying to form a coating film; and in step (2), the volatile component contained in the electron beam-curable composition in the coating film is evaporated to form a dry coating film.

5. The method for producing a coated material according to claim 1, wherein
   the method uses two or more electron beam-curable compositions each containing an ethylenically unsaturated group-containing compound for forming a cured coating film, in order to form two or more cured coating films, and
   the method comprises performing a series of steps (1) and (2) at least two times and then performing step (3).

6. The method for producing a coated material according to claim 5, wherein
   the method uses two or more electron beam-curable compositions each containing an ethylenically unsaturated group-containing compound for forming a cured coating film, in order to form two or more cured coating films, and
   the method comprises
   the step of applying an electron beam-curable composition for forming a first cured coating film to the substrate to form a coating film, this step corresponding to step (1),
   the step of drying the coating film to form a dry coating film when the electron beam-curable composition for forming the first cured coating film contains a volatile component, this step corresponding to step (2),
   the step of applying an electron beam-curable composition for forming a second cured coating film to the coating film obtained in step (1) above or the dry coating film obtained in step (2) above to form a coating film that has a surface viscosity of 1 Pa·s to 300 Pa·s as measured based on the electric-field pickup method, this step corresponding to step (1),
   the step of drying the coating film to form a dry coating film when the electron beam-curable composition for forming the second cured coating film contains a volatile component, this step corresponding to step (2),
   the step of optionally further performing a series of steps (1) and (2) to form coating films or dry coating films of the two or more electron beam-curable compositions on the substrate, and
   the step of irradiating the substrate that has
   two or more coating films or dry coating films obtained above with the electron beam to form cured coating films, this step corresponding to step (3).

7. The method for producing a coated material according to claim 1, wherein the inert gas in step (3) contains nitrogen gas as a main component and has an oxygen concentration of 0.1% by volume or less.

8. The method for producing a coated material according to claim 1, wherein the electron beam in step (3) has an accelerating voltage of 80 kV to 300 kV and has an absorbed dose of 10 kGy to 1,000 kGy.

9. The method for producing a coated material according to claim 1, wherein the substrate in step (1) is made of metal or plastic.

10. The method for producing a coated material according to claim 1, wherein the substrate in step (1) is made of plastic and has a surface free energy of 38 dyn/cm or more.

11. The method for producing a coated material according to claim 10, wherein the substrate in step (1) is made of plastic and is surface-treated.

12. The method for producing a coated material according to claim 1, wherein the substrate in step (1) has an uneven portion, a curved portion, and/or a bent portion.

13. The method for producing a coated material according to claim 1, wherein the one or more electron beam-curable compositions in step (1) contain, as the ethylenically unsaturated group-containing compound, (i) a compound having an aromatic ring and one (meth)acryloyl group and (ii) an oligomer or polymer having a (meth)acryloyl group.

14. A coated material obtained by the method for producing a coated material according to claim 1,
   the coated material comprising one or more cured coating films that have a film thickness of 5 μm to 500 μm, the coated material being a coated substrate for automobiles.

* * * * *